(12) United States Patent
Ikeuchi et al.

(10) Patent No.: US 7,973,088 B2
(45) Date of Patent: Jul. 5, 2011

(54) POLYMER ELECTROLYTE MEMBRANE, METHOD FOR PRODUCING THE SAME, AND PROTON CONDUCTIVITY EVALUATION METHOD FOR POLYMER ELECTROLYTE MEMBRANE

(75) Inventors: Junichi Ikeuchi, Tsukuba (JP); Mitsunori Nodono, Tsukuba (JP); Yasuhiro Yamashita, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 744 days.

(21) Appl. No.: 11/843,839

(22) Filed: Aug. 23, 2007

(65) Prior Publication Data

US 2008/0053820 A1 Mar. 6, 2008

(30) Foreign Application Priority Data

Aug. 25, 2006 (JP) ................. P2006-229697

(51) Int. Cl.
 C08J 5/20 (2006.01)
 C08J 3/00 (2006.01)
 B01J 39/00 (2006.01)
 B05D 1/00 (2006.01)

(52) U.S. Cl. ........... 521/27; 521/25; 528/501; 430/32; 204/192.33; 427/115

(58) Field of Classification Search .......... 521/25, 521/27; 528/501; 430/32; 204/192.33; 427/115
See application file for complete search history.

(56) References Cited

U.S. PATENT DOCUMENTS 6,761,989 B2 * 7/2004 Terahara et al. ............. 429/33

FOREIGN PATENT DOCUMENTS

| JP | 9-110982 A | 4/1997 |
|----|------------|--------|
| JP | 10-21943 A | 1/1998 |
| JP | 10-45913 A | 2/1998 |
| JP | 11-502249 A | 2/1999 |
| JP | 11-116679 A | 4/1999 |
| JP | 2001-250567 A | 9/2001 |
| JP | 2003-31232 A | 1/2003 |
| JP | 2003-113136 A | 4/2003 |
| JP | 2004-190002 A | 7/2004 |
| JP | 2004-359925 A | 12/2004 |
| JP | 2005-190830 A | 7/2005 |
| JP | 2005-232439 A | 9/2005 |
| WO | WO 96/29360 A1 | 9/1996 |

OTHER PUBLICATIONS

Kanaoka et al; Membrane electrode structure for solid polymer fuel cell; Honda Motor Co., Ltd., Japan; Jan. 2006; Chem Abstract 144: 174236.*

(Continued)

*Primary Examiner* — Duc Truong
(74) *Attorney, Agent, or Firm* — Sughrue Mion, PLLC

(57) ABSTRACT

The present invention provides a polymer electrolyte membrane with excellent proton conductivity in its thickness direction. Preferably, the polymer electrolyte membrane containing a polymer compound comprising an ionic segment having an ionic functional group and a nonionic segment having substantially no ionic functional group, and the phase containing ionic segments as a main component and the phase containing nonionic segments as a main component are phase-separated, and in the surface region thereof, the change in the amount of the ionic segment from the surface toward the interior substantially decreases monotonically.

9 Claims, 5 Drawing Sheets

OTHER PUBLICATIONS

I. Cabasso et al., "Synthesis and Characterization of Polymers with Pendent Phosphonate Groups", Journal of Applied Polymer Science, vol. 18, (1974), pp. 1969-1986.

N. Sanada et al., "Extremely low sputtering degradation of polytetrafluoroethylene by $C_{60}$ ion beam applied in XPS analysis", Surface and Interface Analysis, (2004), pp. 280-282.

M. Suzuki et al., "Problems Caused by Ion Sputtering for the Mesh-Replica Method and Caution in Measuring Sputtered Surface Profiles", Journal of Surface Analysis, vol. 12, No. 2, (2005), pp. 178-182.

* cited by examiner

POLYMER ELECTROLYTE MEMBRANE, METHOD FOR PRODUCING THE SAME, AND PROTON CONDUCTIVITY EVALUATION METHOD FOR POLYMER ELECTROLYTE MEMBRANE

BACKGROUND OF THE INVENTION

1. Field of the Invention

The present invention relates to a polymer electrolyte membrane, a method for producing the same, and a proton conductivity evaluation method for a polymer electrolyte membrane.

2. Related Background Art

In the past, perfluorosulfonates such as Nafions (E. I. Du Pont, registered trademark) that have proton conductivity have been known for their excellent fuel cell properties as polymer electrolytes to be used in solid polymer fuel cells.

However, because prior art polymer electrolytes are very difficult to use at high temperatures and are very expensive, the development of a polymer electrolyte membrane that can overcome these disadvantages has been quite active. In such development polymer electrolytes wherein a sulfonic acid group is inserted into an aromatic polyether are considered to have high potential because of their superior heat resistance and excellent membrane strength. For example, the polymer electrolyte membranes of a sulfonated polyether ketone system (Japanese Patent Application Laid-open No. H11-502249) and a sulfonated polyether sulfone system (Japanese Patent Application Laid-open Nos. H10-045913 and H10-021943), etc., have been proposed as such a polymer electrolyte.

Moreover, to obtain high power output a polymer electrolyte membrane for a fuel cell must have high proton conductivity. In general, increasing the phase that has an ionic functional group, such as a sulfonic acid group and the like, is known as a method to increase the proton conductivity of a polymer electrolyte membrane. Among these, a polymer electrolyte membrane having a microphase-separated structure is known to have high proton conductivity and to be affected little by humidity (Japanese Patent Application Laid-open No. 2003-031232).

SUMMARY OF THE INVENTION

Recently, an even greater improvement in power output of fuel cells has been required. High proton conductivity, especially through-thickness conductivity, is preferred in a polymer electrolyte membrane to obtain a higher power output. However, obtaining a polymer electrolyte membrane with superior through-thickness proton conductivity has tended to be extremely difficult with prior art polymer electrolytes.

With the foregoing in view, an object of the present invention is to provide a polymer electrolyte membrane having excellent through-thickness proton conductivity. A further object of present invention is to provide a method for producing such a polymer electrolyte membrane, and to provide a proton conductivity evaluation method for a polymer electrolyte membrane.

The inventors conducted diligent research to attain the above objects, and as a result discovered that through-thickness proton conductivity can be increased in the surface region of the membrane when the ionic functional groups therein have a specific distribution with respect to through-thickness, thus completing the present invention.

More specifically, the polymer electrolyte membrane of the present invention is one containing a polymer compound comprising an ionic segment having an ionic functional group and a nonionic segment having substantially no ionic functional group wherein the phase containing the ionic segments as a main component and the phase containing the nonionic segments as a main component are phase-separated, and in the surface region of at least one surface thereof, the change in the amount of the ionic segment substantially decreases monotonically from the surface toward the interior.

Thus, when the ionic segment is distributed in surface region such that it substantially decreases monotonically in the direction of depth, the conduction of ions toward through-thickness in this region becomes excellent, and the through-thickness proton conductivity in the entire membrane becomes excellent. On the other hand, when the amount of ionic segments in the surface region increases toward the interior, and large fluctuations that include both increases and decreases are created, proton conduction becomes poor and, as a result, sufficiently high through-thickness proton conductivity cannot be obtained therein.

Herein, the statement that the change in the amount of the ionic segment "substantially decreases monotonically" means that the amount of the ionic segment tends to decrease overall toward the interior, and the amount of the ionic segment at all depths deviates little from this decreasing tendency. Therefore, parts wherein the amount of the ionic segment is greater toward the interior than toward the surface are permissible provided the decreasing tendency of the above is maintained as a whole. The "surface region" means the region near surface of the polymer electrolyte membrane. For example, it is preferred that the surface region is region with a depth up to 4 nm from surface in terms of $SiO_2$ described below. Specifically, the region with an actual depth up to 1000 nm from surface is preferred.

The distribution of the ionic segment in the surface region can be revealed by the signal intensity obtained by measurement with X-ray photoelectron spectroscopy (Hereafter, "XPS"). More specifically, the polymer electrolyte membrane of the present invention is one containing a polymer compound comprising an ionic segment having an ionic functional group and a nonionic segment having substantially no ionic functional group wherein the phase containing the ionic segments as a main component and the phase containing the nonionic segments as a main component are phase-separated, and when the intensity of a specific signal selected from the signals originating in the ionic segment is assigned value A and the intensity of a specific signal selected from the signals originating in the nonionic segment is assigned value B for performing XPS, the change in value represented by $A/(A+B)$ substantially decreases monotonically from the surface toward the interior in the surface region at least one surface thereof.

Preferably, the aforementioned signal intensity at each depth is determined for each surface by XPS measurement while gradually removing the surface by sputtering using $C_{60}$ ions. That is, the change in value represented by $A/(A+B)$ is expressed as the change in value of $A/(A+B)$ plotted against sputtering time t when sputtering using $C_{60}$ ions and measurement of the value represented by $A/(A+B)$ are repeatedly performed. In other words, the change in the value represented by $A/(A+B)$ is expressed as the change in the value for $A/(A+B)$ obtained on the surface for each time point t of the elapsed time t when sputtering using $C_{60}$ ions is performed in a direction from the surface toward the interior.

The aforementioned "substantially decreases monotonically" can be verified, for example, by the correlation coefficients between t and the value represented by $A/(A+B)$. More specifically, preferably, in the surface region, the amount of the ionic segment "substantially decrease monotonically" in the case that when the value of $A/(A+B)$ is measured, from the start of sputtering, at each elapsed time point in which the depth in terms of $SiO_2$ is between 0.1 nm and 0.5 nm, and the correlation coefficients between t and the value represented by $A/(A+B)$, which are obtained by taking measurements from the 1st measurement up to an arbitrary nth measurement, are calculated, all correlation coefficients obtained thereby are negative when n is 4 or more. When the value of A/(A+B) changes such that these conditions are satisfied, the polymer electrolyte membrane more assuredly has good through-thickness proton conductivity.

The specific signals originating in the ionic segment and nonionic segment are preferably the kind described below. The specific signal selected from the signals originating in the above ionic segment is preferably not a signal observed from the main nonionic segment. In addition, the specific signal selected from the signals originating in the above nonionic segment is preferably not a signal observed from the main ionic segment.

Consequently, the specific signal used to measure each signal intensity is one wherein the content of the ionic or nonionic segment is reflected more accurately thereby. To obtain an even better effect, more preferably each specific signal is one selected to satisfy both of the aforementioned conditions. The aforementioned "main ionic segment" refers to the moiety having the greatest proportion among the segments classified as ionic segments, and a similar definition applies to the term "main nonionic segment." A signal not observed from the main ionic segment or nonionic segment is preferably a signal that is not observed from a segment accounting for 50 wt % or more of each segment, and more preferably a signal not observed from a segment accounting for 70 wt % or more thereof.

Furthermore, the polymer electrolyte membrane of the present invention is one containing a polymer compound comprising an ionic segment having an ionic functional group and a nonionic segment having substantially no ionic functional group wherein the phase containing a number of the ionic segments and the phase containing a number of the nonionic segments are phase-separated, and preferably in the surface region the membrane does not have a layered part in which the concentration of the nonionic segments is substantially higher than the mean concentration of the nonionic segments throughout the entirety thereof.

Because such a polymer electrolyte membrane does not have a layer in the surface region wherein the concentration of the nonionic segments is higher than the concentration of nonionic segments throughout the entirety thereof, there is extremely little inhibition of proton conduction in the through-thickness direction. Therefore, the polymer electrolyte membrane of this present invention is one having the property of excellent through-thickness proton conductivity.

Preferably the polymer compound constituting the polymer electrolyte membrane of the present invention is an aromatic polymer compound. Such a compound has excellent proton conductivity and can increase the through-thickness proton conductivity of the polymer electrolyte membrane thereby.

Preferably this aromatic system polymer compound contains the structural unit represented by General Formula (1) below because particularly good proton conductivity will be exhibited thereby.

(1)

(wherein $Ar^1$ represents a divalent aromatic group having at least an ionic functional group directly bonded to the aromatic ring as a substituent thereof; and $X^1$ represents a direct bond, oxy group, thioxy group, carbonyl group, or sulfonyl group).

Moreover, it is especially preferable if the polymer is a block copolymer having the aforementioned ionic segment and nonionic segment. Such a block copolymer is effective as the constituent material of the polymer electrolyte membrane of the present invention because when the polymer electrolyte membrane is formed, phase separation between the phase containing the majority of the ionic segments and the phase containing the majority of the nonionic segments occurs easily.

More specifically, the ionic segment of the block polymer will preferably have the structure represented by General Formula (2) below.

(2)

(wherein $Ar^{11}$ represents a divalent aromatic group having at least an ionic functional group directly bonded to the aromatic ring as a substituent thereof; $X^{11}$ represents a direct bond, oxy group, thioxy group, carbonyl group, or sulfonyl group; and d represents an integer of 2 or more).

Especially, if the ionic segment has the structure represented by General Formulas (3a) or (3b) below, excellent proton conductivity tends to be exhibited thereby.

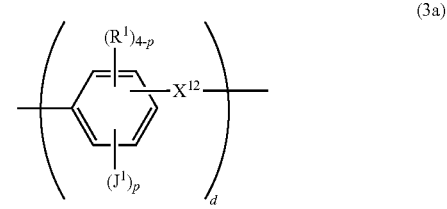
(3a)

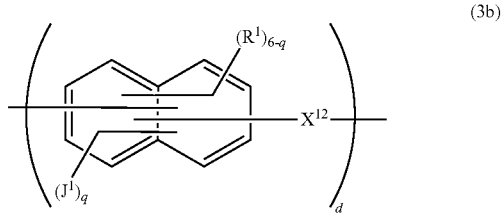
(3b)

(wherein $X^{12}$ represents a direct bond, oxy group, thioxy group, carbonyl group, or sulfonyl group; $R^1$ represents independently a hydrogen atom, $C_{1-20}$ alkyl group, $C_{1-20}$ alkoxy group, $C_{6-20}$ aryl group, $C_{6-20}$ aryloxy group, or $C_{2-20}$ acyl group; $J^1$ represents an ionic functional group, p and q each independently represents 1 or 2; and d is an integer of 2 or more).

The ionic functional group of these polymers is preferably a sulfonic acid group. A polymer and block copolymer having a sulfonic acid group as an ionic functional group can constitute a polymer electrolyte membrane that has especially good proton conductivity.

On the other hand, the nonionic segment in the block copolymer above preferably has the structure represented by General Formula (5) below. The formation of a phase-separated structure having the above ionic segment is facilitated thereby.

(5)

(wherein $Ar^{22}$ represents a divalent aromatic group having no ionic functional group; $X^{22}$ represents a direct bond, oxy group, thioxy group, carbonyl group or sulfonyl group; and e represents an integer of 2 or more).

More specifically, a polymer having as the nonionic segment therein the structure represented by General Formula (6) below is preferred.

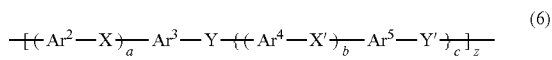
(6)

(wherein a, b, and c each independently is 0 or 1, and z is a positive integer; $Ar^2$, $Ar^3$, $Ar^4$ and $Ar^5$ each independently represents a divalent aromatic group having no ionic functional group; X and X' each independently represents a direct bond or divalent group; and Y and Y' each independently represents an oxy group or a thioxy group).

Moreover, the method for producing the polymer electrolyte membrane of the present invention is the preferred method therefor. More specifically, the manufacturing method of the present invention is a method for producing a polymer electrolyte membrane containing a polymer electrolyte comprising a polymer compound having an ionic segment having an ionic functional group and a nonionic segment having substantially no ionic functional group, the method comprising the steps of: applying a solution containing the polymer electrolyte to a substrate having a surface comprising a metal or a metal oxide; and evaporating the solvent from the solution, and in the evaporation step, the time from the start of solvent evaporation until completion thereof is 60 minutes or less.

As noted above, the polymer electrolyte membrane can exhibit particularly excellent through-thickness proton conductivity by having the ionic segment distributed in the surface region thereof. Therefore, verification of such a distribution of the ionic segment in the surface region can be used as a method for evaluating through-thickness proton conductivity of a polymer electrolyte membrane.

Based on this viewpoint, the present invention provides a method for evaluating the proton conductivity of a polymer electrolyte membrane containing a polymer compound comprising an ionic segment having an ionic functional group and a nonionic segment having no ionic functional group, the method comprising a step in which sputtering is performed using $C_{60}$ ions from the surface toward the interior, and by performing XPS on the surface at sputtering elapsed time t, the measured intensity A of a specific signal selected from the signals originating in the ionic segment and the measured intensity B of a specific signal selected from the signals originating in the nonionic segment are obtained for each time point t; and a step of determining whether the change in value represented by A/(A+B) plotted against t is substantially monotonically decreasing or not.

In the above evaluation method, if the change in the value represented by A/(A+B) plotted against t in the surface region is judged to be substantially decreasing monotonically, it can be concluded that this polymer electrolyte membrane has sufficient through-thickness proton conductivity.

In such an evaluation method it is preferable that, in the first step, A/(A+B) is measured from the start of sputtering for each elapsed time in which the removed $SiO_2$ thickness is between 0.1 nm and 0.5 nm, and in the second step, the correlation coefficients between t and the value represented by A/(A+B), which are obtained by taking measurements from the 1st measurement up to an arbitrary nth measurement, are obtained and judged to be negative or positive for all correlation coefficients obtained when n is 4 or more. It becomes possible thereby to ascertain the decreasing tendency of the ionic segment in the surface region more accurately and evaluate the through-thickness proton conductivity of the polymer electrolyte membrane well.

With the present invention it becomes possible to provide a polymer electrolyte membrane having excellent through-thickness proton conductivity. In addition, with the present invention it becomes possible to provide a method for producing the kind of polymer electrolyte membrane of the present invention and a method for evaluating proton conductivity of a polymer electrolyte membrane.

DESCRIPTION OF THE PREFERRED EMBODIMENTS

Figure 1:
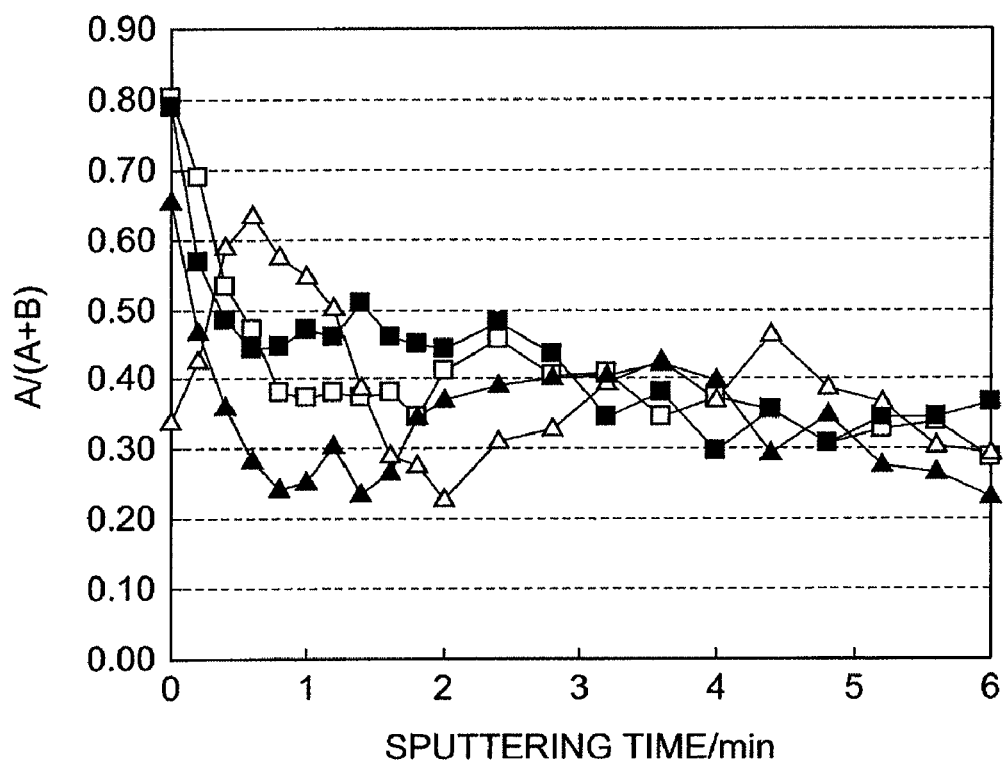
FIG. 1 is a graph showing the change in the value of A/(A+B) plotted against sputtering time t in membranes of Example 1 and Comparative Example 1.

The preferred embodiments of the present invention are described below.

(Polymer Electrolyte)

First the preferred polymer electrolyte constituting the polymer electrolyte membrane of the preferred embodiments will be described. The polymer electrolyte contains an ionic segment having an ionic functional group and a nonionic segment essentially not having an ionic functional group.

A substance having the above structure can be used without limitation as such a polymer electrolyte. Items (A) to (D) below provide typical examples of a polymer electrolyte having an ionic functional group as a proton conducting group.

(A) A polymer electrolyte wherein an ionic functional group is introduced into a hydrocarbon polymer having a main chain comprising an aliphatic hydrocarbon.

(B) An aromatic polymer electrolyte wherein an ionic functional group is introduced into an aromatic polymer compound having a main chain containing an aromatic ring.

(C) A hydrocarbon polymer electrolyte wherein an ionic functional group is introduced into a polymer having as a main chain an aliphatic hydrocarbon and an inorganic unit structure such as a siloxane group, phosphazene group, and the like.

(D) A polymer electrolyte wherein an ionic functional group is introduced into a copolymer in which repeating units containing the polymer compounds of (A) to (C) above are suitably combined prior to the introduction of the ionic functional group.

Among these, an aromatic system polymer electrolyte like (B) above is preferred as the polymer electrolyte from the standpoint of heat resistance and ease of recycling. Preferred aromatic polymer electrolytes include polymers having an aromatic ring as the main chain of the polymer and having an ionic functional group on a side chain and/or the main chain. It is preferred if the aromatic polymer electrolyte is soluble in a solvent. This enables a membrane to be easily formed by the publicly known solution casting process.

The ionic functional group in the aromatic polymer electrolyte may be directly substituted onto the aromatic ring constituting the main chain of the polymer, or it may be linked to the aromatic ring constituting the main chain via a connecting group.

Herein, aromatic polymer compounds having a main chain containing an aromatic ring include, for example, those such as polyarylenes that have a main chain wherein the aromatic rings are linked together directly, and those having a main chain wherein the aromatic rings are linked via a divalent group. Examples of the divalent group in the main chain of the latter include an oxy group, thioxy group, carbonyl group, sulfinyl group, sulfonyl group, amide group, ester group, carboxylic acid ester group, an alkylene group of roughly $C_{1-4}$, an alkenyl group of roughly $C_{2-4}$, an alkynyl group of roughly $C_{2-4}$, and the like. Among these, an oxy group, thioxy group, sulfonyl group, or carbonyl group is preferred.

In addition, examples of the aromatic ring contained in the main chain of the aromatic polymer compound include a divalent aromatic group such as a phenylene group, naphthylene group, anthracene diyl group, fluorene diyl group, biphenylene group, and the like; and divalent aromatic heterocyclic rings such as a pyridine diyl group, furan diyl group, thiophenylene group, imidazolyl group, indole diyl group, quinoxaline diyl group and the like.

A compound containing the structural unit represented by General Formula (1) below is preferred as such an aromatic polymer electrolyte.

(1)

(wherein $Ar^1$ represents a divalent aromatic group having at least an ionic functional group directly bonded to the aromatic ring as a substituent thereof; and $X^1$ represents a direct bond, oxy group, thioxy group, carbonyl group, or sulfonyl group).

A divalent aromatic group listed above is preferred as $Ar^1$ in General Formula (1) above, and a phenylene group, biphenylene group, or naphthylene diyl group is especially preferred. This divalent aromatic group may have a substituent in addition to the aforementioned ionic functional group. Examples of the substituent include an optionally substituted $C_{1-20}$ alkyl group, optionally substituted $C_{1-20}$ alkoxy group, optionally substituted $C_{6-20}$ aryl group, optionally substituted $C_{6-20}$ aryloxy group, $C_{2-20}$ acyl group, halogen group, nitro group, and the like.

In addition, the ionic functional group is a functional group that enables ion conduction, particularly proton conduction, to be created when the polymer electrolyte membrane is formed, and an ion exchange group is typical thereof. This ion exchange group can be either a cation exchange group (acidic group) or an anion exchange group (basic group), but from the standpoint of obtaining high proton conductivity, a cation exchange group is prepared.

Examples of a cation exchange group include —$SO_3H$, —COOH, —$PO(OH)_2$, —POH(OH), —$SO_2NHSO_2$—, and -Ph(OH) (wherein Ph represents a phenyl group). Examples of an anion exchange group include —$NH_2$, —NHR, —NRR', —$NRR'R''^+$ and —$NH_3^+$ (wherein R, R' and R'' each independently represents an alkyl group, cycloalkyl group, or aryl group). Either a part or all of the ion exchange group can form a salt with a counter ion.

Typical examples of an aromatic polymer compound having the structure represented by General Formula (1) above include polymers such as polyether ketone, polyether ether ketone, polysulfone, polyether sulfone, polyether ether sulfone, poly (arylene ether), polyimide, polyphenylene, poly ((4-phenoxybenzoyl)-1,4-phenylene), polyphenylene sulfide, polyphenyl quinoxalene and the like wherein an ionic functional group has been introduced, and sulfoarylated polybenzimidazole, sulfoalkylated polybenzimidazole, phosphoalkylated polybenzimidazole and the like (for example, Japanese Patent Application Laid-open No. H9-110982), and phosphonated poly(phenylene ether) (for example, J. Appl. Polym. Sci., 18, 1969 (1974)).

The polymer compound constituting the polymer electrolyte has both a segment having an ionic functional group (hereinafter, "ionic segment") and a segment essentially not having an ionic functional group (hereinafter, "nonionic segment"). Herein, the term "segment" means a structural unit having constant physicochemical properties in the polymer compound, for example, a unit constructed by repeating units having the same main constituent elements. A block in a polymer referred to as a block polymer is a typical example of such a segment. In addition, a single repeating unit of an alternating copolymer and random copolymer (for example, Japanese Patent Application Laid-open No. H11-116679) can also be considered such a segment.

Among these, the above block copolymer, especially block copolymer having ionic segment and nonionic segment, is preferable as the polymer compound constituting the polymer electrolyte because a membrane in which a phase containing the ionic segments as a main component and a phase containing the nonionic segments as a main component are phase-separated can be easily constructed by being formed domains of the ionic segments and the nonionic segments respectively within the membrane. Such block copolymer may have other structural unit in addition to the ionic segments and the nonionic segments. Example of the other structural unit is the structural unit connecting the ionic segments and the nonionic segments.

Specific examples of the block copolymer include the block copolymer having a sulfonated aromatic polymer segment described in Japanese Patent Application Laid-open No. 2001-250567, and the block copolymers having a polyether ketone or polyether sulfone as the main chain structure and also having a segment containing a sulfonic acid group described in Japanese Patent Application Laid-open Nos. 2003-31232, 2004-359925, 2005-232439, and 2003-113136, etc.

Below is described in detail a preferred example of a block copolymer having an ionic segment and a nonionic segment that is most suitable as the polymer electrolyte.

First, a segment comprising a structure wherein the structural unit represented by General Formula (1) above is linked together multiple times is preferred as the ionic segment. However, a structural unit having no ionic functional group, for example, a structural unit containing a divalent aromatic group that does not have an ionic functional group represented as $Ar^1$ in General Formula (1), may be partly contained in such a segment. In such an instance, a moiety having an average of 0.5 or more ionic functional groups per 1 structural unit can be used as an applicable guideline for the ionic segment. A segment having the structure represented by General Formula (2) below can exemplify the ionic segment.

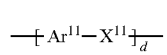
(2)

(wherein $Ar^{11}$ represents a divalent aromatic group having at least an ionic functional group directly bonded to the aromatic ring as a substituent thereof; $X^{11}$ represents a direct bond, oxy group thioxy group, carbonyl group, or sulfonyl group; and d represents an integer of 2 or more).

A moiety similar to $Ar^1$ described above can exemplify $Ar^{11}$ in this formula. The following items are typical substituents of the divalent aromatic group of $Ar^{11}$ in addition to the ionic functional group. Specifically, examples of the optionally substituted $C_{1-20}$ alkyl group include $C_{1-20}$ alkyl groups such as a methyl, ethyl, n-propyl, isopropyl, n-butyl, sec-butyl, isobutyl, n-pentyl, 2,2-dimethylpropyl, cyclopentyl, n-hexyl, cyclohexyl, or 2-methylpentyl group and the like; or one of the above groups wherein a fluorine atom or substituent group such as a hydroxyl, nitryl, amino, methoxy, ethoxy, isopropyloxy, phenyl, naphthyl, phenoxy, naphthyloxy, and the like is substituted thereto. Preferably, the total number of carbon atoms in these groups will be 1 to 20.

Examples of the optionally substituted $C_{1-20}$ alkoxy group include $C_{1-20}$ alkoxy groups such as a methoxy, ethoxy, n-propyloxy, isopropyloxy, n-butyloxy, sec-butyloxy, tert-butyloxy, isobutyloxy, n-pentyloxy, 2,2-dimethylpropyloxy, cyclopentyloxy, n-hexyloxy, cyclohexyloxy, or 2-methylpentyloxy group and the like; or one of the above groups wherein a fluorine atom or substituent group such as a hydroxyl, nitryl, amino, methoxy, ethoxy, isopropyloxy, phenyl, naphthyl, phenoxy, or naphthyloxy, and the like is substituted thereto. Preferably, the total number of carbon atoms in these groups will be 1 to 20.

Examples of the optionally substituted $C_{6-20}$ aryl group include aryl groups such as a phenyl, naphthyl, anthracenyl, or biphenyl group and the like; or one of the above groups wherein a fluorine atom or substituent group such as a hydroxyl, nitryl, amino, methoxy, ethoxy, isopropyloxy, phenyl, naphthyl, phenoxy, or naphthyloxy group and the like is substituted thereto. Preferably, the total number of carbon atoms in these groups will be 6 to 20.

Examples of the optionally substituted $C_{6-20}$ aryloxy group include aryloxy groups such as a phenyloxy, naphthyloxy, anthracenyloxy, or biphenyloxy group and the like; or one of the above groups wherein a fluorine atom or substituent group such as a hydroxyl, nitryl, amino, methoxy, ethoxy, isopropyloxy, phenyl, naphthyl, phenoxy, or naphthyloxy group and the like is substituted thereto. Preferably, the total number of carbon atoms in these groups will be 6 to 20.

Examples of the $C_{2-20}$ acyl group include acyl groups such as a benzoyl, naphthoyl, acetyl, or propionyl group and the like which may be substituted. Substituents thereof include a fluorine atom or group such as a hydroxyl, nitryl, amino, methoxy, ethoxy, isopropyloxy, phenyl, naphthyl, phenoxy, or naphthyloxy group and the like. Preferably, the total number of carbon atoms in these groups will be 2 to 20.

In General Formula (2), d is an integer of 2 or more representing the number of repeating units of the structure within the parentheses. Preferably, d is an integer of 5 or more, more preferably an integer of 5 to 1000, even more preferably an integer of 10 to 1000, and most preferably an integer of 20 to 500. A value of 5 or more is preferred for d because the proton conductivity in the polymer electrolyte containing such an ionic segment becomes excellent thereby. On the other hand, a value of 1000 or less is preferred for d because the manufacture of the segment can be facilitated while still maintaining sufficient proton conductivity.

The segments represented by General Formulas (3a) and (3b) can be noted as preferred concrete examples of the ionic segment represented by General Formula (2).

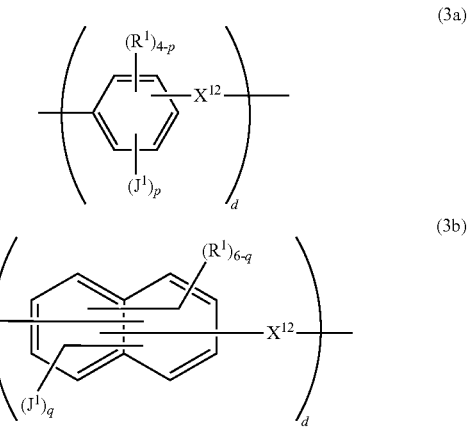
(3a)

(3b)

(wherein $X^{12}$ represents a direct bond, oxy group, thioxy group, carbonyl group, or sulfonyl group; $R^1$ represents independently a hydrogen atom, $C_{1-20}$ alkyl group, $C_{1-20}$ alkoxy group, $C_{1-20}$ aryl group, $C_{6-20}$ aryloxy group, or $C_{2-20}$ acyl group; $J^1$ represents an ionic functional group, p and q each independently represents 1 or 2; and d is an integer of 2 or more).

A polymer electrolyte comprising a block copolymer containing such an ionic segment is one that can form a polymer electrolyte membrane having dimensional stability upon absorption of water in addition to high proton conductivity, and can form a polymer electrolyte membrane that is particularly excellent from the standpoint of membrane strength. $R^1$ in Formulas (3a) and (3b) represents the above substituents, and among these a hydrogen atom is preferred. In other words, a group that is a phenylene or naphthylene diyl having no substituent other than an ionic functional group is especially suitable as the aromatic group in Formulas (3a) and (3b).

As the segment represented by General Formula (3a), a segment containing a structural unit selected from items 3a-1 to 3a-12 exemplifies one having a sulfonic acid group as the ionic functional group thereof. These segments can be manufactured in accordance with Japanese Patent Application Laid-open No. 2004-190002, for example.

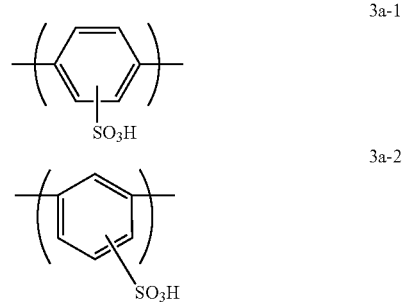
3a-1

3a-2

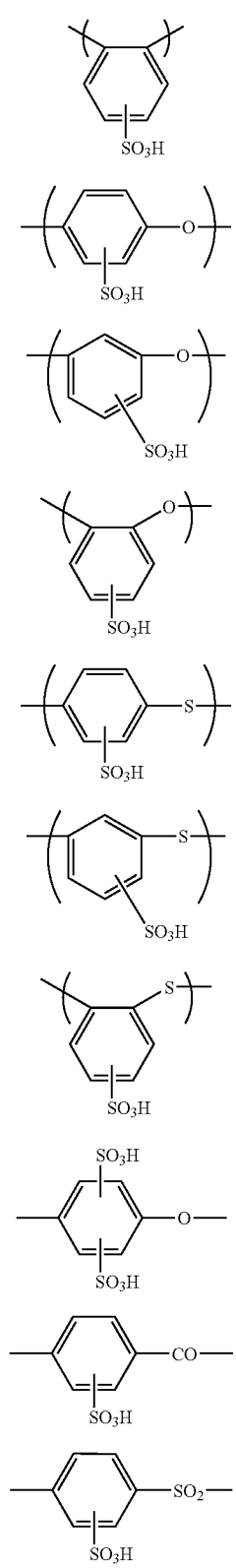
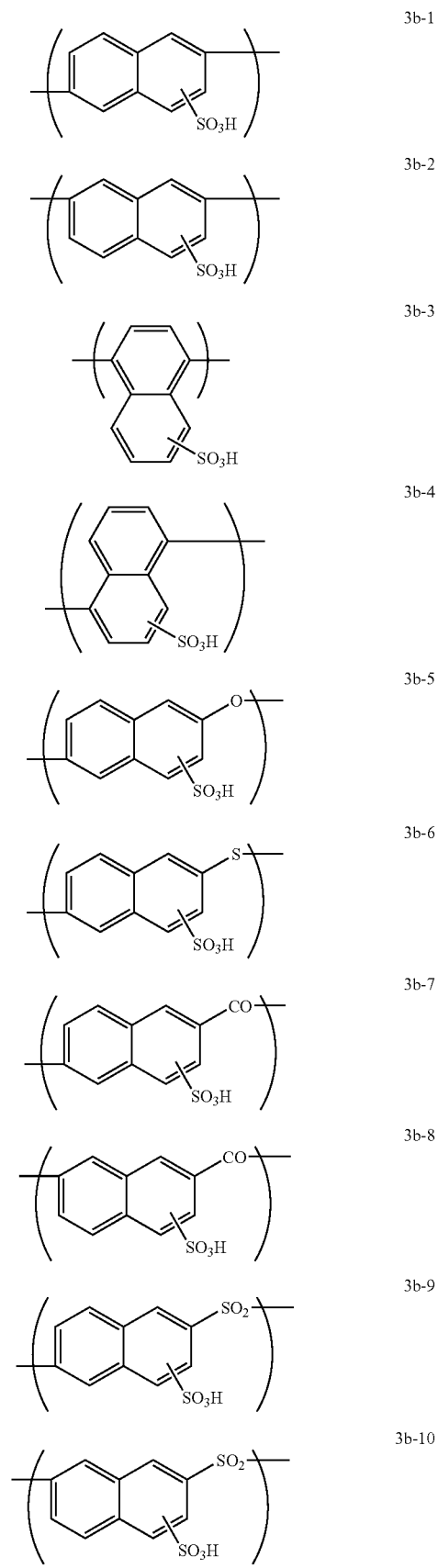
Moreover, as the segment represented by General Formula (3b), a segment containing a structural unit selected from items 3b-1 to 3b-12 exemplifies one having a sulfonic aid group as the ionic functional group thereof.

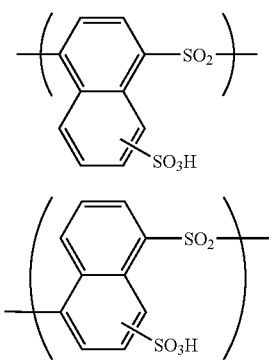

A segment having a combination of the structural unit constituting a segment represented by General Formula (3a) and a structural unit constituting a segment represented by General Formula (3b) may also be used as the ionic segment. Preferably a total of d segments thereof will be linked together.

As the ionic functional group, the cation exchange group, especially —COOH, —SO$_3$H, —PO(OH)$_2$ or —SO$_2$NHSO$_2$ are preferred as mentioned above. A functional group comprising a combination thereof can also be used. Among these, a segment containing a sulfonic acid group (—SO$_3$H), which is a strong acid, is especially preferred as the ionic functional group.

On the other hand, the nonionic segment is a segment essentially not having an ionic functional group. Herein, the term "segment having essentially no ionic functional group" means a segment that cannot exhibit ion conductivity. Therefore, a structural unit comprising an ionic functional group may be contained therein provided ion conductivity is not exhibited by this segment. The nonionic segment is preferably one having on average 0.1 or fewer ionic functional groups per one structural unit, more preferably one having 0.05 or fewer functional groups, and still more preferably one having 0 (i.e., no) ionic functional groups.

More specifically, a segment having the structure represented by General Formula (5) below is preferred as the nonionic segment.

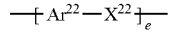 (5)

(wherein Ar$^{22}$ represents a divalent aromatic group having no ionic functional group; X$^{22}$ represents a direct bond, oxy group, thioxy group, carbonyl group or sulfonyl group; and e represents an integer of 2 or more).

Herein, Ar$^{22}$, which is the aromatic group in General Formula (5), may have a substituent other than an ionic functional group. Examples of the substituent include an optionally substituted C$_{1-20}$ alkyl group, optionally substituted C$_{1-20}$ alkoxy group, optionally substituted C$_{6-20}$ aryl group, optionally substituted C$_{6-20}$ aryloxy group or a C$_{2-20}$ acyl group. Specific examples of these groups are the same as the substituents of Ar$^{11}$ in General Formula (2) above. Provided the scope of the nonionic segment satisfies the above definition thereof, a structural unit such as one wherein Ar$^{22}$ has an ionic functional unit may be included in the structure represented by General Formula (5).

In General Formula (5), e is an integer of 2 or more representing the number of repeating units of the structure within the parentheses. Preferably, e is an integer of 5 or more, more preferably an integer of 5 to 1000, even more preferably an integer of 10 to 1000, and most preferably an integer of 20 to 500. A value of 5 or more is preferred for e because the fuel cell polymer electrolyte membrane formed thereof tends to have excellent strength. On the other hand, a value of 1000 or less is preferred for e because the manufacture of the segment is facilitated thereby.

The segment represented by General Formula (6) below can be noted as a most suitable concrete example of the nonionic segment.

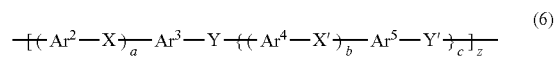 (6)

(wherein a, b, and c each independently is 0 or 1, and z is a positive integer; Ar$^2$, Ar$^3$, Ar$^4$ and Ar$^5$ each independently represents a divalent aromatic group and may be optionally substituted with a C$_{1-20}$ alkyl group, C$_{1-20}$ alkoxy group, C$_{6-20}$ aryl group, C$_{6-20}$ aryloxy group, or C$_{2-20}$ acyl group; X and X' each independently represents a direct bond or divalent group; and Y and Y' each independently represents an oxy group or a thioxy group).

In General Formula (6), z is an integer of 2 or more representing the number of repeating units of the structure within the parentheses, and representing the degree of polymerization of this segment. Preferably, z is an integer of 5 or more, more preferably an integer of 5 to 1000, even more preferably an integer of 10 to 1000, and most preferably an integer of 20 to 500. A value of 5 or more is preferred for z because the fuel cell polymer electrolyte membrane formed thereof tends to have excellent strength. On the other hand, a value of 1000 or less is preferred for z because the manufacture of the segment can be facilitated. Just as in the case of General Formula (5), a structural unit such as one wherein Ar$^2$, Ar$^3$, Ar$^4$, or Ar$^5$ has an ionic functional unit may be included in the structure represented by General Formula (6) provided the scope of the nonionic segment satisfies the above definition thereof.

The segments represented by the following structures can be noted as most suitable concrete examples of the nonionic segment represented by General Formula (6).

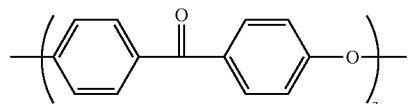

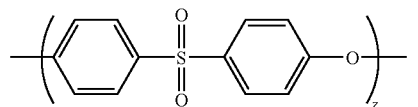

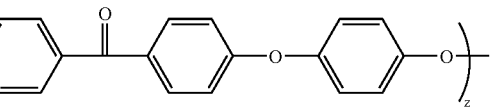

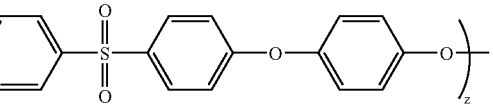

-continued

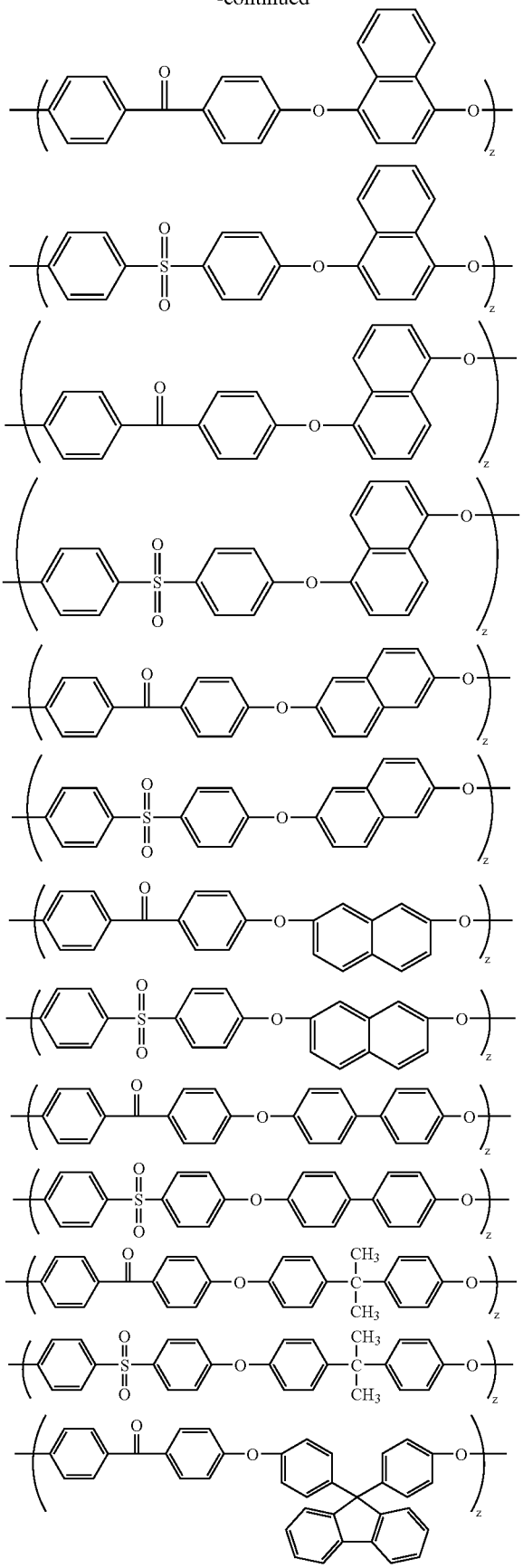

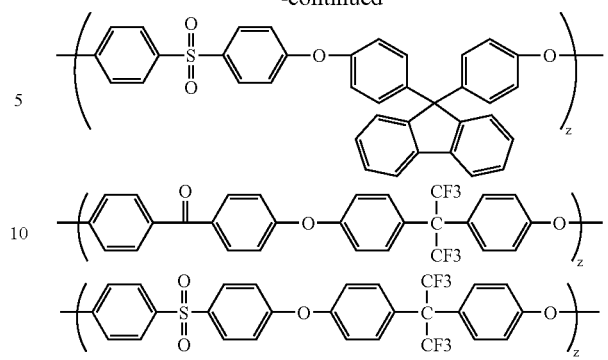

The most suitable examples of the polymer compound constituting the polymer electrolyte have been described above, but from the standpoint of manifesting excellent ion conductivity, the ion exchange capacity (the number of ionic functional group equivalents per unit weight of the polymer compound) in this polymer compound is preferably 0.5 to 4 meq/g, and more preferably 1.0 to 3.0 meq/g.

(Method for Producing Polymer Electrolyte Membrane)

Next, the method for producing the polymer electrolyte membrane of the preferred embodiments will be described. The polymer electrolyte membrane can be produced via a step wherein a solution containing the polymer electrolyte containing a polymer compound comprising an ionic segment having an ionic functional group and a nonionic segment having substantially no ionic functional group is applied to a specified substrate (application step) and a step wherein the solvent is evaporated from the applied solution (evaporation step). The preferred embodiments described above can be used without limitation as the polymer electrolyte, and when a polymer compound comprising a block copolymer having an ionic segment represented by General Formula (1) above and a nonionic segment represented by General Formula (5) above is used, a most suitable polymer electrolyte membrane such as the one described below tends to be obtained by this process more easily.

The application of the solution containing the polymer electrolyte to the substrate in the application step can be performed by methods such as casting, dipping, graded coating, spin coating, gravure coating, flexo printing, ink jet printing, and the like.

The solvent used for the solution containing the polymer electrolyte is one wherein the polymer electrolyte is soluble, and preferably is one that can be removed within the evaporation time in the evaporation step described below. The preferred solvent can be selected as needed in accordance with the structure of the polymer electrolyte and the like.

Examples of such a solvent include aprotic polar solvents such as N,N-dimethyl formamide, N,N-dimethyl acetamide, N-methyl-2-pyrrolidone, dimethyl sulfoxide, and the like; chlorine-based solvents such as dichloromethane, chloroform, 1,2-dichloroethane, chlorobenzene, dichlorobenzene, and the like; alcohols such as methanol, ethanol, propanol, and the like; and alkylene glycol mono-alkyl ethers and the like such as ethylene glycol monomethyl ether, ethylene glycol monoethyl ether, propylene glycol monomethyl ether, propylene glycol monoethyl ether and the like. These solvents can be used alone, or as a combination of two or more types thereof as needed.

As noted above, the optimal solvent will differ depending on the molecular structure of the polymer electrolyte and, for example, in the case of a polymer electrolyte containing a block copolymer having an ionic segment represented by Formula (3a) or (3b) above, and a nonionic segment represented by Formula (6) above, a solvent comprising an aprotic solvent as the main component such as N,N-dimethyl formamide, N,N-dimethyl acetamide, N-methyl-2-pyrrolidone, dimethyl sulfoxide, and the like is preferred, and dimethyl sulfoxide is especially preferred. The use of these solvents facilitates adjustment of the solvent drying time to the preferred range.

The concentration of the polymer electrolyte in the solvent will depend on the molecular weight of the polymer electrolyte, but preferably will be 5 to 40 wt %, and more preferably 5 to 30 wt %. A concentration of 5 wt % or higher tends to facilitate obtaining a polymer electrolyte film with a practical thickness. A concentration of 40 wt % or less tends to lower the viscosity of the polymer electrolyte solution and facilitate obtaining a polymer electrolyte membrane with a smoother surface.

Additives commonly used for polymers such as plasticizers, stabilizers, mold lubricants, and the like can also be added to the polymer electrolyte solution within a range that does not contradict the object of the present invention.

Moreover, a substrate that is not swollen or dissolved by the polymer electrolyte solution, and also enables removal of the membrane obtained after membrane-forming is preferred as the substrate for supporting the solvent-applied membrane in the application step. A metal, metal oxide, resin film, and the like can be listed as examples of the substrate. However, considering the effect of the substrate on the compositional distribution of the outermost surface of the polymer electrolyte membrane, a substrate having a surface consisting of a metal or metal oxide is preferred.

Aluminum, chromium, nickel, iron, gold, silver, copper, platinum, tin, palladium, tantalum, zinc, titanium, silicon or an alloy having the same as the principal ingredient thereof can be noted as the metal constituting either the surface or the entirety of the substrate. Among these aluminum is preferred from the standpoint of versatility, cost, and the like. Moreover, aluminum oxide, titanium oxide, tin oxide, zinc oxide, glass, and the like can be noted as metal oxides. Among these, aluminum oxide or glass is preferred especially from the standpoint of cost, versatility, etc.

Moreover, if the surface of the substrate to be used in the application step has been contaminated, it will be difficult to obtain an excellent polymer electrolyte membrane, and the effect of the present invention might not be sufficiently achieved. Thus, to avoid contamination of such a surface, it is preferable that the surface of the substrate be cleaned as needed. The method of cleaning the surface of the substrate can be properly selected in accordance with the material of the substrate. Moreover, a substrate having a surface wherein a thin film of a metal or metal oxide noted above was formed by deposition thereof is preferred due to the fact that it has a clean surface. In such a case, the method of deposition can be selected as needed from publicly known methods.

In the evaporation step, the time from the start to the completion of the evaporation of the solvent (hereinafter, "evaporation time") is set as 60 minutes or less. This evaporation time is the time during occurring concentration change of the polymer electrolyte in solution applied to the substrate or formed polymer electrolyte membrane. Measurement of the concentration change of the polymer electrolyte can be performed, for example, by regularly extracting a part of solution or formed polymer electrolyte membrane during the evaporation step and measuring mass thereof.

More specifically, the evaporation time can be established, for example, as the time a substantial mass change occurs in a part having a predetermined surface area of the solution applied to the substrate or of the polymer electrolyte membrane formed therefrom during the evaporation step. In this case, whether the mass change occurs or not can be confirmed by regularly extracting a part having a predetermined surface area of the solution or of the polymer electrolyte membrane during the evaporation step and measuring the mass thereof.

In practice, the evaporation time can be considered as the time from the start to the completion of evaporation of the solvent when, for example, the time point when the solution is applied and formed on the substrate is used as the time point designating the start of evaporation of the solvent, and the time point when the concentration change or mass change of the polymer electrolyte substantially stops, or the time point when the evaporation step is completed, whichever comes first, is used as the time point designating the completion of the evaporation of the solvent. Incidentally, "the concentration change of the polymer electrolyte substantially stops" means that a difference (amount of change) in concentration of the polymer electrolyte before and after a predetermined time period cannot be detected (less than 0.1 wt %). Similarly, "the mass change of the polymer electrolyte substantially stops" means that a difference (amount of change) in mass of the polymer electrolyte before and after a predetermined time period cannot be detected (less than 0.1 wt %).

Preferably, the evaporation time is 55 minutes or less, and more preferably 40 minutes or less. Moreover, the lower limit of the evaporation time is preferably set at 10 seconds. Establishing such an evaporation time enables shortening the manufacturing time of polymer electrolyte membrane, and enables a polymer electrolyte membrane having a most suitable composition to be formed as described below. The evaporation time can be adjusted by properly setting the conditions of temperature, pressure, draft and the like in the evaporation step.

Moreover, preferably the temperature in the evaporation step is set equal to or higher than the temperature of the freezing point of the solvent and is a temperature equal to or lower than 50° C. higher than the boiling point of the solvent. When the temperature conditions of the evaporation step are lower, it becomes difficult extremely to evaporate off the solvent. On the other hand, when the upper limit temperature is exceeded, formation of a uniform film tends to become almost impossible. Therefore, preferably the temperature will be set to obtain the above evaporation time from such a suitable temperature range.

From the standpoint of obtaining a polymer electrolyte membrane with an excellent composition more reliably, preferably the upper limit of the temperature in the evaporation step is set to a temperature 10° C. lower than the boiling point of the solvent, and more preferably, 30° C. lower than the boiling point of the solvent. Moreover, the lower limit is preferably set to 20° C. For example, when the solvent is dimethyl sulfoxide, the temperature in the evaporation step is preferably set to 30° C. to 150° C., more preferably 40° C. to 120° C., even more preferably 40° C. to 110° C., and a temperature range of 50° C. to 100° C. is especially preferred.

(Polymer Electrolyte Membrane)

The polymer electrolyte membrane of these embodiments can be obtained suitably by the aforementioned method for producing the embodiments. Such a polymer electrolyte membrane is a membrane comprising the polymer electrolyte having a microphase-separated structure consisting of a phase (microdomain) containing the majority of the ionic segments and a phase (microdomain) containing the majority of the nonionic segments.

The thickness of the polymer electrolyte membrane is not particularly limited in the present invention, but is preferably 5 to 200 μm, more preferably 8 to 60 μm, and even more preferably 15 to 50 μm. With a thickness of more than 5 μm, a polymer electrolyte membrane having the strength to withstand practical use is easily obtained. Moreover, with a thickness of less than 200 μm, membrane resistance is lowered sufficiently, and it becomes easy to improve the power output when using the membrane in a fuel cell and the like. The thickness of the polymer electrolyte membrane can be controlled by changing the concentration of the polymer electrolyte solution and the application thickness to the substrate to be used at the time of manufacture.

The polymer electrolyte membrane of the preferred embodiments has the following distribution state of ionic segments in its surface region. More specifically, in the surface region of the polymer electrolyte membrane the change in the amount of the ionic segment essentially decreases monotonically in the direction from the surface toward the interior. The preferred method for measuring the change in the amount of the ionic segment is described in greater detail below.

The amount of ionic segment in the polymer electrolyte membrane is preferably expressed by the intensity of a signal originating in the ionic segment obtained by measuring the chemical composition of the membrane by X-ray photoelectron spectroscopy (XPS). Herein, a signal originating in the ionic segment refers to a signal that originates in a chemical structure characteristic of the ionic segment, and a signal originating in an ionic functional group of the ionic segment, for example, is preferred.

Furthermore, the change in the amount of the ionic segment in the direction from the surface to the interior is preferably ascertained by the relative change in the amount of the ionic segment and the amount of the nonionic segment in the polymer electrolyte membrane. Specifically, the signal originating in the ionic segment and the signal originating in the nonionic segment are measured by XPS, and the intensities thereof are compared. Just as in the case of the signal from the ionic segment, the signal originating in the nonionic segment is a signal originating in a chemical structure characteristic of the nonionic segment.

A plurality of signals originating in each segment will normally be observed, such signals corresponding to the various chemical structures of the segments, but for the above measurement of relative change, a specific signal can be arbitrarily selected from among the plurality of signals. From the standpoint of accurately ascertaining the amount of change in the ionic segment, the same signal for each segment is used for a series of measurements taken on the same surface of one polymer electrolyte membrane. In addition, from the same standpoint, preferably only one signal is selected as the specific signal therefor.

The change in the amount of the ionic segment can be suitably tracked by the value of A/(A+B) when the intensity of the XPS signal originating in the ionic segment is expressed by A and the intensity of the XPS signal originating in the nonionic segment is expressed as B. If this value essentially decreases monotonically from the surface toward the interior, it can be concluded that the amount of the ionic segment essentially decreases monotonically from the surface toward the interior.

For the signal intensity, the measured signal intensity (the total count of photoelectrons or the counts of per unit time) can be used as is, or it can be used after multiplying it by a constant such as a sensitivity coefficient and the like using an instrument, analytical software, and the like. From the standpoint of minimizing the effect of error and accurately determining the change in the value of A/(A+B), preferably the specific signal originating in each segment will be selected so that the difference in signal intensity between A and B will not become exceedingly large.

The selection of each of the following as the specific signal originating in the ionic or nonionic segment is particularly suitable from the standpoint of ascertaining the amount of change in the ionic segment more accurately. More specifically, selecting a signal that is not observed from the main nonionic segment as the specific signal selected from among the signals originating in the ionic segment is preferred. Conversely, selecting a signal that is not observed from the main ionic segment as the specific signal selected from among the signals originating in the nonionic segment is preferred. As a result, at least one of the signals originating in the ionic segment and the nonionic segment will be a signal that does not originate in the other main segment and therefore, the intensity of this one signal will essentially reflect only the amount of the segment expressed by that signal.

The aforementioned measurement of the signal intensity in the direction from the surface toward the interior can be performed by removing the polymer electrolyte membrane little by little from the surface toward the interior, and measuring the surface by XPS at each point in time during the removal process. In this case, the removal of the polymer electrolyte is preferably performed by sputtering with $C_{60}$ ions. Measuring the intensity of each signal from the surface toward the interior becomes possible by repeating the two steps of sputtering with $C_{60}$ ions at predetermined times and conducting an XPS measurement of the surface after sputtering.

In this case sputtering with $C_{60}$ ions provides a means for reducing the damage caused by sputtering in comparison with sputtering using a rare gas ion such as argon, which is commonly used for surface analysis. Therefore, sputtering using $C_{60}$ ions is preferred for materials that are easily damaged such as organic materials like the polymer electrolyte membranes of these embodiments (see Surface and Interface Analysis, 2004, 36, p. 280-282; Journal of Surface Analysis, 2005, 12, p. 178).

The surface area to be measured during XPS measurement will preferably be set to a sufficiently large area with respect to the size of the microphase separation in the polymer electrolyte membrane. This enables more accurate measurement of the amounts of the ionic segment and nonionic segment chemical structures in the microphase-separated polymer electrolyte membrane. For example, when the size of the microphase separation ranges from several nm to several tens of nm, preferably the diameter of the measurement region will be between 1 μm and 10 mm, and more preferably between 10 μm and 1 mm. In such an instance, when the diameter of the measurement region exceeds 10 mm, the measurement result becomes easily affected by irregularities in the polymer electrolyte membrane, unevenness in the sputtering depth, and the like. As a result, the concentration distribution of the chemical structures of the ionic and nonionic segments in the measurement region becomes averaged out, and in some cases the distribution cannot be measured accurately. On the other hand, when the measurement region is smaller than 1 μm, the measurement results are greatly affected by the microphase separation shape in that part of the measurement region, and there is concern that the phase distribution of the entirety cannot be measured properly thereby.

When sputtering with $C_{60}$ ions is performed, the change in the value of A/(A+B) from the surface to the interior is expressed by the relationship between the elapsed time from the start of sputtering t and the value of A/(A+B) obtained by XPS measurement of the surface at each t. Although the XPS measurement is performed at each designated time after the starting point of sputtering, the interval Δt of the XPS measurement need not be constant throughout the measurement.

In addition to hours, minutes, seconds and the like, which are the conventional units for expressing time, the units of t and Δt can be expressed as X nm in terms of $SiO_2$. This refers to the time needed to remove a thickness of X nm of $SiO_2$ when $SiO_2$ is removed using the same method. Units of X nm in terms of $SiO_2$ can also be used when expressing the distance (depth) of the surface below the initial surface at each time point. This refers to the depth of the surface below the initial surface that was obtained when sputtering was performed only for the time of X nm in terms of $SiO_2$. Depth expressed by conversion to $SiO_2$ thickness is a conventional proportional relationship to the actual depth. Although the proportional constant in this case differs depending on the type of the polymer electrolyte membrane, the actual depth will usually be 2 to 20-fold deeper than the depth expressed by X nm in terms of $SiO_2$.

Preferably Δt, which is the XPS measurement interval, will be set to a suitable time based on the size of the microphase separation of the polymer electrolyte membrane. From the standpoint of measuring the distribution of the chemical structures belonging to the ionic segment and the nonionic segment in the polymer electrolyte membrane in detail, the value of Δt should be small, but if it is too small the number of times sputtering must be stopped will increase, and the sputtering rate will tend to become unstable. From this standpoint, preferably Δt will be set at between 0.1 nm and 0.5 nm in terms of $SiO_2$.

Moreover, because the distribution of the ionic segment and the nonionic segment in the vicinity of the outermost surface is particularly important in the polymer electrolyte membrane, setting a small Δt, in the region near the surface is especially preferable. For example, in the depth range up to 2 nm in terms of $SiO_2$, Δt will preferably be set between 0.1 nm and 0.3 nm in terms of $SiO_2$. From the standpoint of guaranteeing a sufficiently stable sputtering rate, it is desirable to set Δt to at least 10 seconds or more.

However, if sputtering time t is too long, damage to the surface of the polymer electrolyte membrane, the influence of the carbon component originating in the $C_{60}$, and the like might become so great that an accurate XPS measurement will become difficult. Therefore, to avoid such problems it is desirable to set the upper limit of t properly to match the polymer electrolyte membrane.

Moreover, sputtering with $C_{60}$ ions is preferably performed at a rate such that removal of between 0.5 nm and 2 nm in terms of $SiO_2$ thickness per minute occurs, and more preferably at a rate such that removal of about 1 nm in terms of $SiO_2$ per minute occurs. Not only will a sufficiently stable sputtering rate be obtained thereby, but it will also be possible to decrease the damage to the sample.

As noted above, the signal originating in the ionic segment and the signal originating in the nonionic segment can be obtained by selecting an arbitrary signal for each segment from the XPS spectrum. Moreover, the intensity of these signals can be obtained by performing peak isolation through proper waveshape analysis using the integral value of each spectrum. As stated above, because an increase in the carbon composition originating therein is seen accompanying the irradiation with the $C_{60}$ ions when $C_{60}$ sputtering is performed, it is preferable to exclude the peaks of C1s C—C and C—H bonds.

The relationship between the sputtering time t when measured as described above, and the value of A/(A+B) at each t will express the change in the amount of ionic segment from the surface to the interior of the polymer electrolyte membrane. Furthermore, in the polymer electrolyte of the preferred embodiments the value of A/(A+B) with respect to t substantially decreases monotonically in the surface region.

Here, "monotonic decrease" is generally defined as follows. More specifically, when the condition that $x_1 < x_2$, then $f(x_1) \geq f(x_2)$ is satisfied, f(x) decreases monotonically (see, for example, Iwanami Dictionary of Mathematics, 3rd ed., (edited by Mathematical Society of Japan, Iwanami Shoten, Publishers)) [Iwanami Sugaku Jiten, Dai 3 ban (Nihon Sugakkai Henshu, Iwanami Shoten]. However, cases may be included in the polymer electrolyte membrane of these embodiments wherein f(t)=A/(A+B) substantially decreases monotonically, but such a definition is not satisfied.

Therefore, the term "substantially decreases monotonically" in the present invention refers to cases wherein conditions such as those described below are satisfied. More specifically, when the value of A/(A+B) at sputtering time t is expressed as f(t)=A/(A+B), at the sputtering times of XPS measurement $t_1, t_2, \ldots, t_n$, a respective $f(t_1), f(t_2), \ldots, f(t_n)$ will be obtained. Herein, $t_1$ refers to the time point at the start of sputtering. Therefore, $f(t_1)$ becomes A/(A+B) on the outermost surface of the polymer electrolyte membrane.

When measurement is performed for m times from the start of sputtering (a plurality of times exceeding 4) and the correlation coefficients between $t_1, t_2, \ldots, t_n$, and $f(t_1), f(t_2), \ldots, f(t_n)$ which are obtained by taking measurements from the 1st measurement up to an arbitrary nth measurement are all determined for the interval from n=2 to n=m, the value of A/(A+B) is seen to be "substantially decreasing monotonically" with respect to t if all correlation coefficients obtained are negative when n is 4 or more. In other words, an "substantially decreasing monotonically" value of A/(A+B) is realized when the correlation coefficients between t and the value expressed as A/(A+B) obtained by taking measurements from the 1st measurement, which is the time point of the start of sputtering, up to an arbitrary nth measurement are calculated, all correlation coefficients obtained when n is 4 or more are negative.

The aforementioned correlation coefficient is a statistical numerical value, and generally its reliability increases with the number of data points. This correlation coefficient is defined by Mathematical Formula below, and it refers to a good fit to a linear relationship between x and y (see, for example, Introduction to Statistics, edited by Statistics Office, College of Arts and Sciences, University of Tokyo, University of Tokyo Press)) [Tokeigaku Nyumon (Tokyo Daigaku Kyoyo Gakubu Tokeigaku Kyoshitsu Hen, Tokyo Daigaku Suppankai]. Moreover, the positive or negative value of this correlation coefficient corresponds to the slope of the regression line formed by x and y.

$$r = \frac{\sum (x_i - \bar{x})(y_i - \bar{y})}{\sqrt{\sum (x_i - \bar{x})^2} \sqrt{\sum (y_i - \bar{y})^2}}$$

(wherein, $\bar{x}$ and $\bar{y}$ represent the mean values of x and y)

When determining this correlation coefficient it is preferable that the XPS measurement interval Δt, be constant, but because in the polymer electrolyte membrane of these embodiments the distribution in the range near the surface is particularly important, so it is permissible to vary Δt between the region near the surface and a region more to the interior.

For example, the value of Δt a depth of 2 nm or more in terms of $SiO_2$ may be 1 to 3-fold of Δt a depth of 2 nm or less in terms of $SiO_2$. By varying Δt, not only can the distribution in the region near the surface be ascertained in particular detail, but it will also be possible to suitably shorten the measurement time.

In accordance with the above, the change in the amount of ionic segment from the surface toward the interior in the surface region of the polymer electrolyte membrane of these embodiments substantially decreases monotonically. Moreover, this kind of ionic segment distribution in the surface region enables excellent through-thickness proton conductivity to be exhibited thereby.

Preferably the surface region is a region with a depth up to 4 nm in terms of $SiO_2$ from the surface of the polymer electrolyte membrane, more preferably a region with a depth up to 6 nm in terms of $SiO_2$ therefrom, and still more preferably a region with a depth up to 10 nm in terms of $SiO_2$ therefrom. Moreover, although at least one surface of the polymer electrolyte membrane must have the aforementioned ionic segment distribution, preferably both sides will have the aforementioned ionic segment distribution because particularly excellent through-thickness proton conductivity is obtained thereby.

Furthermore, as noted above, the polymer electrolyte membrane of the present invention is one wherein a phase containing the ionic segments as a main component and a phase containing the nonionic segments as a main component are phase-separated, and in a surface region said membrane does not have a layer in which the concentration of the nonionic segments is essentially higher than the mean concentration of the nonionic segments throughout the entirety thereof.

This means that if the surface region of the polymer electrolyte membrane is assumed to be formed by an arbitrary plurality of layers in the through-thickness direction, the concentration of the nonionic segments will be lower in each of these layers than the mean value of the nonionic segment concentration throughout the entirety of the polymer electrolyte membrane. In a polymer electrolyte membrane having a surface region satisfying such a condition, extreme hindrance of through-thickness ion conductivity by the nonionic segments will be decreased. As a result, such a polymer electrolyte membrane enables excellent through-thickness ion conductivity to be obtained thereby.

(Proton Conductivity Evaluation Method of Polymer Electrolyte Membrane)

By having the aforementioned kind of ionic segment distribution in the surface region, the polymer electrolyte membrane will have excellent through-thickness proton conductivity. Therefore, if the ionic segment distribution status in the surface region can be ascertained, it becomes possible to evaluate the through-thickness proton conductivity of an unknown polymer electrolyte membrane.

In particular, the method for ascertaining the ionic segment distribution by performing $C_{60}$ ion sputtering and calculating the relationship between the sputtering time t and the above value expressed by A/(A+B) is suitable because it is possible to accurately evaluate proton conductivity thereby.

In such an evaluation, at first, sputtering with $C_{60}$ ions is performed from the surface in the direction of depth, and an XPS measurement is performed on the surface of the sputtering elapsed time t. After that, based on this result, intensity A of the signal originating in the ionic segment at each time point t wherein XPS measurement was performed and intensity B of the signal originating in the aforementioned nonionic segment are determined, and the value expressed by A/(A+B) is calculated (step 1).

Then it is judged whether the change in the value expressed by A/(A+B) is substantially decreasing monotonically with respect to the sputtering elapsed time t (step 2).

When the change in the value expressed by A/(A+B) with respect to t is decreasing monotonically in step 2, it can be concluded that the polymer electrolyte membrane has excellent through-thickness proton conductivity. On the other hand, if it is not decreasing monotonically, if it is increasing, or if large changes including both increases and decreases are seen, it can be concluded that the through-thickness proton conductivity of the membrane is insufficient.

As described above, judgment of whether the change is decreasing monotonically or not can be performed based on the correlation coefficient between t and A/(A+B). More specifically, in the first step A/(A+B) is first measured at each time of between 0.1 nm and 0.5 nm in terms of $SiO_2$ elapses from the start of the sputtering.

Next, in the second step correlation coefficients between t and the value expressed as A/(A+B) obtained by taking measurements up to an arbitrary nth measurement are determined, and it is judged whether all correlation coefficients obtained when n is 4 or greater are positive or negative. As a result of this evaluation, when all correlation coefficients obtained by the 4th measurement and beyond are negative, it can be concluded that A/(A+B) substantially decreases monotonically with respect to t. Furthermore, a polymer electrolyte membrane exhibiting such a tendency can be evaluated as having excellent through-thickness proton conductivity. On the other hand, if all correlation coefficients obtained by the 4th measurement and beyond are not negative, the through-thickness proton conductivity can be judged to be insufficient.

All the same conditions as those described in the preferred embodiments of the "polymer electrolyte membrane" above can be used as the conditions for the XPS measurement surface area, sputtering rate, t, Δt, and the like in this evaluation.

EXAMPLES

The present invention is described in detail below through examples, but the present invention is by no means limited thereto.

[Manufacture of the Polymer Electrolyte]

Synthesis Example 1

Under an argon atmosphere 600 mL of dimethyl sulfoxide (DMSO), 200 mL of toluene, 26.5 g (106.3 mmol) of sodium 2,5-dichlorobenzesulfonate, 10.0 g of terminally chlorinated polyether sulfone of Chemical Formula (7) below (SUMIKAEXCEL PES 5200P made by Sumitomo Chemical Co., Ltd.), and 43.8 g (280.2 mmol) of 2,2'-bipyridyl were placed in flask fitted with an azeotropic distillation apparatus and stirred.

(7)

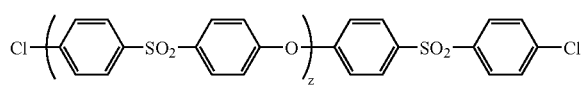

Next, the temperature of this solution was raised to 150° C., and after the toluene was distilled off by heating, and the water in the system was removed by azeotropic dehydration, the solution was cooled to 60° C. Then 73.4 g (266.9 mmol) of bis(1,5-dichloro octadiene) nickel (0) was added, the temperature was raised to 80° C., and stirring was performed for 5 h at that temperature. After the solution was let cool, the polymer was precipitated out by adding the reaction mixture to a large volume of 6 mol/L of hydrochloric acid, and the precipitate was then separated by filtration. The procedure of rinsing with 6 mol/L hydrochloric acid and filtering was performed several times on the polymer compound obtained thereby, and then the polymer compound was rinsed with water until the filtrate became neutral. By vacuum drying the polymer compound, 16.3 g of the target polymer electrolyte, which is the polyarylene block copolymer represented by Chemical Formula (8) below, was obtained. The ion exchange capacity of this block copolymer was 2.3 [meq/g].

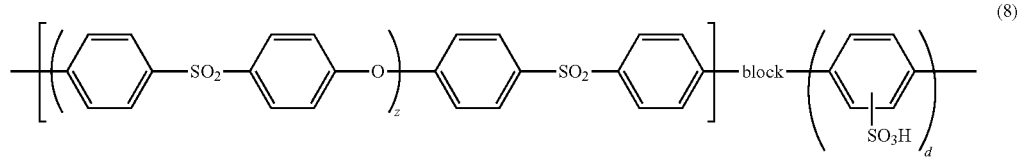

As mentioned above, d and z in Formula (7) and (8) represent the degree of polymerization of each segment respectively, and notation of "block" shows that the structures (segments) connecting together by the "block" forms block copolymerization (This is similar as follows).

[Manufacture of the Polymer Electrolyte Membrane]

Example 1

A polymer electrolyte solution was prepared by dissolving the polyarylene block copolymer prepared according to Synthesis Example 1 in DMSO to a concentration of 10 wt %. The polymer electrolyte solution was cast-coated onto a polyethylene terephthalate (PET) substrate coated with aluminum by vapor deposition, the solvent was removed from this coating membrane by evaporation under normal atmosphere in a temperature range of 60 to 100° C. for 20 min, and the membrane obtained thereby was dried. Thereafter, a hydrochloric acid treatment and rinse with ion exchange water were performed to prepare the polymer electrolyte membrane containing the polyarylene block copolymer. Hereinafter, the surface of the polymer electrolyte membrane that did not come in contact with the substrate is designated as the first surface and the surface that did come in contact with the substrate is designated as the second surface.

Comparative Example 1

A polymer electrolyte membrane was prepared in the same manner as described in Example 1 except that the polymer electrolyte solution was cast coated directly on a PET substrate.

[Verification of Phase-Separated Structure of Polymer Electrolyte Membrane]

The polymer electrolyte membranes of Example 1 and Comparative Example 1 were immersed at room temperature for 30 min in a staining solution containing 15% potassium iodide and 5% iodine, embedded in a precured epoxy resin, and 60 nm sections thereof were cut using a microtome. The sections obtained thereby were collected on a copper mesh, and a difference in contrast resulting from the staining was seen when they were observed under a transmission electron microscope (Hitachi, Ltd., H9000NAR). Because a phase containing a number of the ionic functional groups is stained by the potassium iodide and appears darker, it was confirmed that phases containing the ionic segments as a main component and phases containing the nonionic segments as a main component were phase-separated in both polymer electrolyte membranes of Example 1 and Comparative Example 1.

[Structural Evaluation of Surface Region of Polymer Electrolyte Membrane]

The structure of the surface region of the polymer electrolyte membranes of Example 1 and Comparative Example 1 were evaluated by the method described below. More specifically, $C_{60}$ sputtering was performed from the surface toward the interior of the polymer electrolyte membrane, and an XPS measurement of the surface at each time point wherein a predetermined time had elapsed from the start of sputtering was performed using a Quantera SXM (ULVAC-PHI, INC. imaging XPS).

Thereby, an S2p spectrum at each respective sputtering time point t, which was the elapsed time from the start of sputtering, was obtained. Then peak fitting of these S2p spectra was performed, to separate the signals originating in sulfonic acid and the signals originating in sulfone. And based thereon intensity (A) of the former signal and intensity (B) of the latter signal were obtained. Then the value of A/(A+B) at each sputtering time point t was obtained. This measurement was performed for both the first surface and the second surface of the polymer electrolyte membranes.

In the XPS measurement, a monochromated Al-Kα ray (1486.6 eV, X-ray spot 100 μm) was used as the X-ray, and a 1 eV neutral electron gun and 7 eV argon ion gun were used for charge compensation during measurement. In addition, measurement was performed by X-ray irradiation from a direction 25° from the sample normal line, and photoelectron detection at a direction 20° from the sample normal line. In the peak fitting, the peak position were fixed to values obtained by performing measurements on a polymer membrane containing either the ionic or the nonionic segment alone as a reference sample, and performing peak fitting thereof.

Moreover, $C_{60}$ sputtering was performed from a direction of 70° with respect to the sample normal line using a $C_{60}$ ion gun (PHI06-C60, ULVAC-PHI, INC.). The acceleration voltage was 10 kV, and the sputtering rate was 1 nm/min when $SiO_2$ was sputtered. Furthermore, XPS measurements were performed every 0.2 min for the initial 2 min of sputtering, and every 0.4 min while sputtering time was from 2 min to 6 min. The sputtering time t when XPS measurement was performed was designated as $t_1, t_2, \ldots, t_n$.

Additionally, spectrum analysis was performed using a MultiPak V6.1A (ULVAC-PHI, INC.). The binding energy was calibrated as C1s (C—C and C—H bonds) is 284.6 eV. The peak fitting of the S2p spectra was performed based on the peak position obtained by measurements on a polymer membrane containing either the ionic or the nonionic segment alone as a reference sample. A sulfur component reduced by the sputtering was observed at 163.6 eV, but this was isolated and excluded during the peak fitting.

As the result of such an XPS measurement, results were obtained that can be expressed as a graph in FIG. 1, showing the change in the value of A/(A+B) plotted against sputtering time t for the respective polymer electrolyte membranes of Example 1 and Comparative Example 1. In FIG. 1 the plots of the black and white squares represent the first surface and second surface, respectively, of the polymer electrolyte membrane of Example 1, and the plots of the black and white triangles represent the first surface and second surface, respectively, of the polymer electrolyte membrane of Comparative Example 1.

By FIG. 1 it was verified that in the polymer electrolyte membrane of Example 1 the value of A/(A+B) in the surface region (depth of 0 to 6 nm in terms of $SiO_2$ from the surface) substantially decreases monotonically.

On the other hand, in the polymer electrolyte membrane of Comparative Example 1, on the second surface the value of A/(A+B) increased in the range of sputtering time t up to 0.6 min. Furthermore, changes in A/(A+B) that were not monotonic were seen in the range in the range of t from 0 to 2 min.

Figure 2:
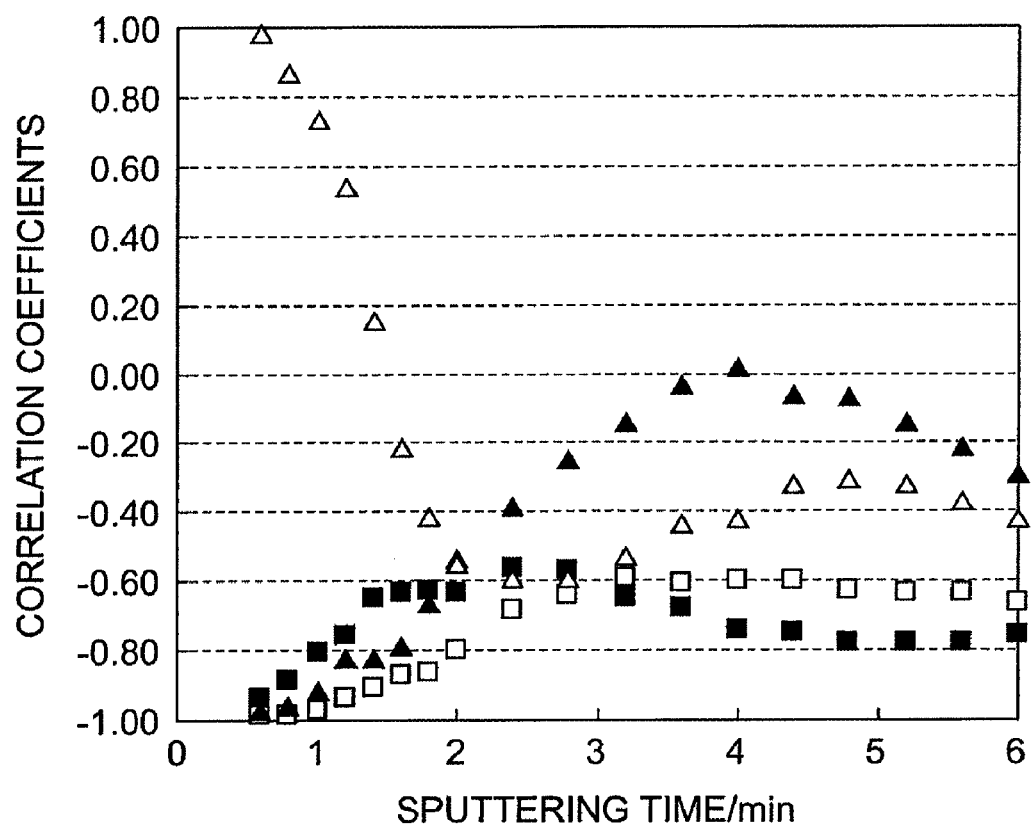
FIG. 2 is a graph showing the change in correlation coefficients plotted against sputtering time t in membranes of Example 1 and Comparative Example 1.

In addition, based on the above obtained results, all correlation coefficients between $t_1, t_2, \ldots, t_n$ and $f(t_1), f(t_2), \ldots, f(t_n)$ at a sputtering time of $t_n$ (wherein $n \geq 4$) were calculated for the polymer electrolyte membranes of Example 1 and Comparative Example 1, respectively, using f(t)=A/(A+B). Results were obtained thereby that can be expressed as a graph showing the change in the correlation coefficient plotted against sputtering time t. as shown in FIG. 2. In FIG. 2 the black and white squares in the plots represent the first surface and second surface, respectively, of the polymer electrolyte membrane of Example 1, and the plots of the black and white triangles represent the first surface and second surface, respectively, of the polymer electrolyte membrane of Comparative Example 1.

As shown in FIG. 2, it was verified that the correlation coefficients are negative in the entire measured range for the polymer electrolyte membrane of Example 1. On the other hand, in the polymer electrolyte membrane of Comparative Example 1 the correlation coefficients at the second surface in the range of sputtering time t of 1.4 min or less were positive. At the first surface, the correlation coefficients in the range of sputtering time about 4 min were positive.

[Measurement of Membrane Resistance]

The through-thickness membrane resistance of the polymer electrolyte membranes of Example 1 and Comparative Example 1, respectively, was measured using the method shown below. Table 1 shows the results that were obtained together with the membrane thickness and ion-exchange capacity of each polymer electrolyte membrane.

More specifically, two measurement cells wherein a carbon electrode was attached to one side of a piece of silicone rubber (thickness 200 μm) having an aperture of 1 cm² were prepared, and the carbon electrodes were positioned opposite each other. Then the terminals of a impedance measurement device were directly attached to the measurement cells.

Next the polymer electrolyte membrane was sandwiched between the two measurement cells, and the impedance between the two measurement cells was measured at a temperature of 23° C. Then the resistance value was measured again in a state wherein the polymer electrolyte membrane had been removed.

The resistance value obtained with the polymer electrolyte membrane and the resistance value obtained without the polymer electrolyte membrane were compared, and based on the difference between the resistance values, the through-thickness membrane resistance of the polymer electrolyte membrane was calculated. The measurements were performed in a state wherein both sides of the polymer electrolyte membrane were in contact with 1 mol/L dilute sulfuric acid.

TABLE 1

|  | Membrane thickness (μm) | Ion-exchange capacity (meq/g) | Through-thickness membrane resistance (mΩ · cm²) |
| --- | --- | --- | --- |
| Example 1 | 25 | 2.3 | 49 |
| Comparative Example 1 | 25 | 2.3 | 55 |

From Table 1 it was confirmed that the polymer electrolyte membrane of Example 1 has lower through-thickness resistance than that of Comparative Example 1, and therefore has excellent through-thickness proton conductivity.

[Manufacture of the Polymer Electrolyte]

Synthesis Example 2

At an internal temperature of 70° C. 1.62 g of anhydrous nickel chloride and 15 mL of dimethyl sulfoxide were mixed together. To this mixture was added 2.15 g of 2,2'-bipyridine, and the mixture was stirred 10 min at the same temperature to prepare a nickel-containing solution.

To a solution obtained by dissolving 1.49 g of (2,2-dimethylpropyl)-2,5-dichlorobenzenesulfonic acid and 0.50 g of polyether sulfone (SUMIKAEXCEL PES 5200P made by Sumitomo Chemical Co., Ltd.) in 5 mL of dimethyl sulfoxide was added 1.23 g of zinc powder at 70° C. Next, the above nickel-containing solution was poured thereinto, and a polymerization reaction was performed for 4 h at 70° C. After the reaction mixture was added to 60 mL of methanol, 60 mL of 6 mol/L hydrochloric acid was added, and stirring was performed for 1 h. The solid precipitate was separated by filtration and dried to obtain 1.62 g of a grey-white polyarylene.

To a mixed solution of 0.16 g of lithium bromide monohydrate and 8 mL of N-methyl-2-pyrrolidone was added 0.23 g of the polyarylene obtained above, and a reaction was performed for 24 h at 120° C. Then the reaction mixture was poured into 80 mL of 6 mol/L hydrochloric acid, and stirring was performed for 1 h. The solid precipitate was separated by filtration. The separated solid was dried to obtain 0.06 g of the polyarylene block copolymer represented by General Formula (9) below. The ion exchange capacity of this block copolymer was 2.4 meq/g.

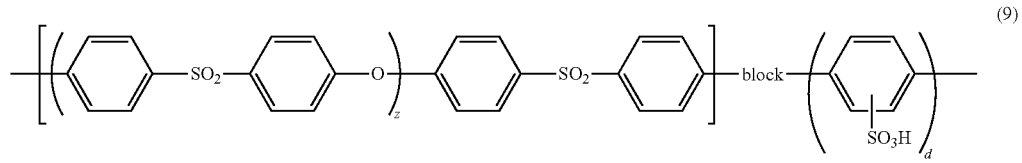

(9)

[Manufacture of the Polymer Electrolyte Membrane]

Example 2

A polymer electrolyte solution was prepared by dissolving the polyarylene block copolymer prepared according to Synthesis Example 2 in DMSO to a concentration of 10 wt %. The polymer electrolyte solution was cast coated on a silicon substrate. Then, the solvent was removed from this coating membrane by evaporation under normal atmosphere in 80° C. for 60 min, and the membrane obtained thereby was dried. Thereafter, a hydrochloric acid treatment and rinse with ion exchange water were performed to prepare the polymer electrolyte membrane containing the polyarylene block copolymer.

Comparative Example 2

A polymer electrolyte membrane was prepared in the same manner as described in Example 2 except that the polymer electrolyte solution was cast coated directly on a PET substrate.

Comparative Example 3

A polymer electrolyte membrane was prepared in the same manner as described in Comparative Example 2 except that the solvent was removed for 90 min.

[Verification of Phase-Separated Structure of Polymer Electrolyte Membrane]

The polymer electrolyte membranes of Example 2 and of Comparative Examples 2 and 3 were observed by transmission electron microscope (Hitachi, Ltd., H9000NAR) using the same method and procedure as described above, and the phase-separated structure of the polymer electrolyte membranes was verified thereby. As a result, it was confirmed that in the polymer electrolyte membranes of Example 2 and of Comparative Examples 2 and 3, phases containing the ionic segments as a main component and phases containing the nonionic segments as a main component were phase-separated.

[Structural Evaluation of Surface Region of Polymer Electrolyte Membrane]

The structure of the surface region of the polymer electrolyte membranes of Example 2, Comparative Example 2 and Comparative Example 3 were evaluated in the same manner as described in Example 1 except that 4 eV neutral electron gun and 3 eV argon ion gun were used and that XPS measurements were performed every 0.2 min up to sputtering time 6 min. The sputtering rate was 1.3 nm/min when $SiO_2$ was sputtered. Same as description above, a peak about 163.6 eV was isolated and excluded during the peak fitting.

Figure 3:
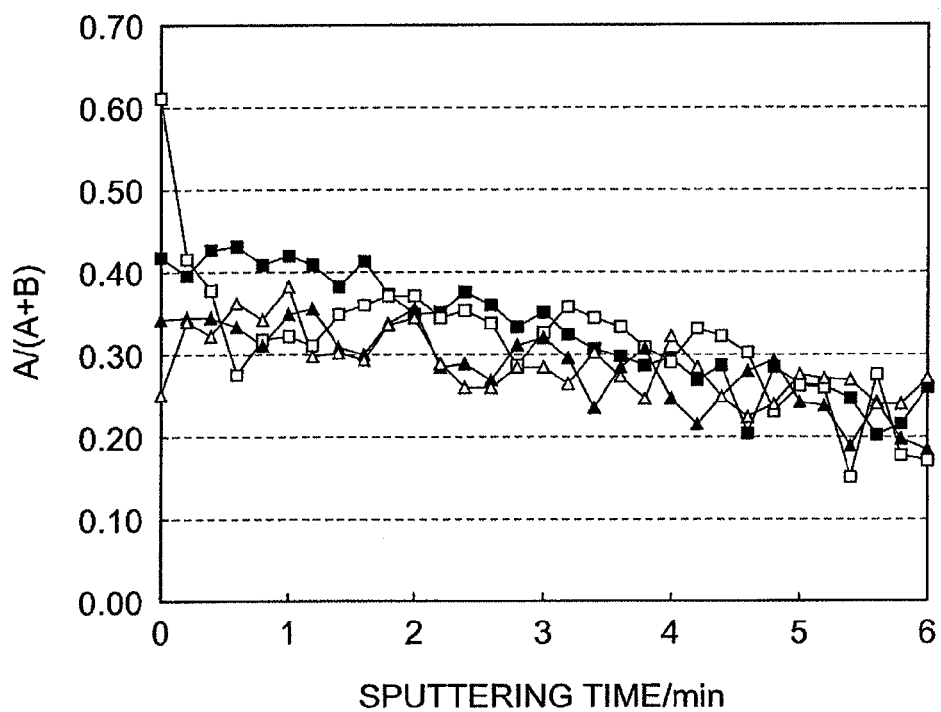
FIG. 3 is a graph showing the change in the value of A/(A+B) plotted against sputtering time t in membranes of Example 2 and Comparative Example 2.
Figure 4:
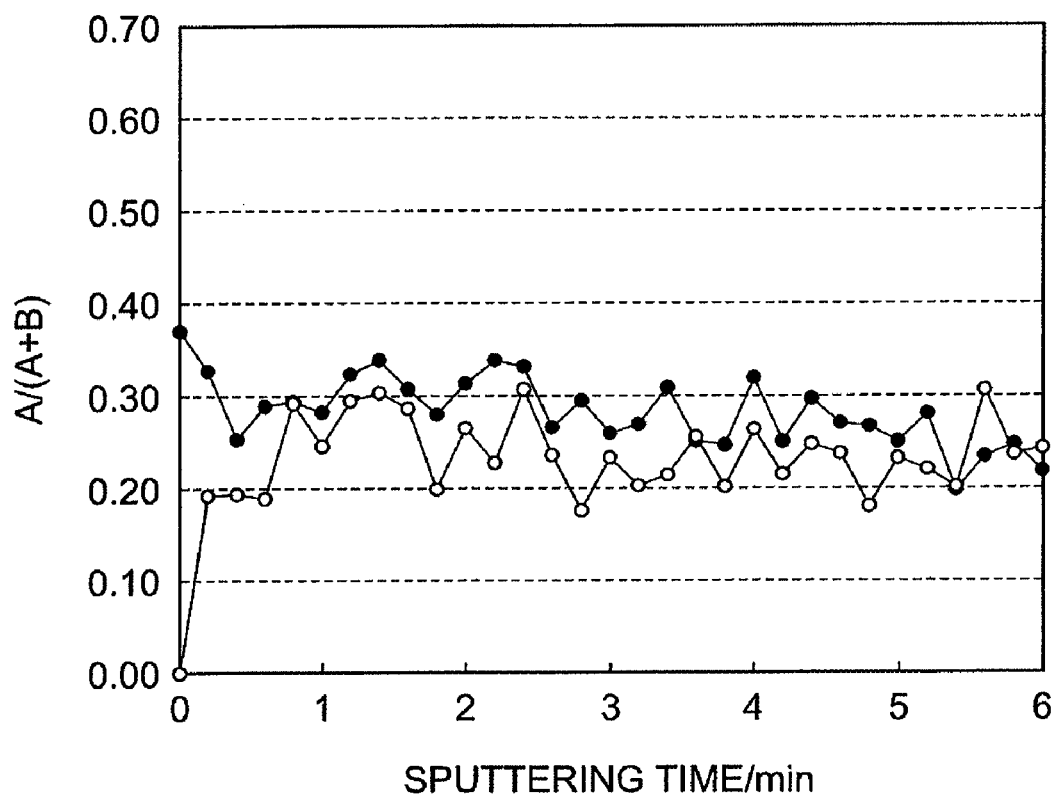
FIG. 4 is a graph showing the change in the value of A/(A+B) plotted against sputtering time t in membranes of Comparative Example 3.

As the result of such an XPS measurement, results were obtained that can be expressed as a graph in FIGS. 3 and 4 showing the change in the value of A/(A+B) plotted against sputtering time t for the respective polymer electrolyte membranes of Example 2, Comparative Example 2 and Comparative Example 3. In FIG. 3 the plots of the black and white squares represent the first surface and second surface, respectively, of the polymer electrolyte membrane of Example 2, the plots of the black and white triangles represent the first surface and second surface, respectively, of the polymer electrolyte membrane of Comparative Example 2. In FIG. 4 the black and white circular plots represent the first surface and second surface, respectively, of the polymer electrolyte membrane of Comparative Example 3.

By FIG. 3 it was verified that in the polymer electrolyte membrane of Example 2 the value of A/(A+B) in the surface region of second surface (depth of 0 to 7.8 nm in terms of $SiO_2$ from the surface) essentially decreases monotonically.

On the other hand, in the polymer electrolyte membrane of Comparative Example 3, on the second surface the value of A/(A+B) increased in the range of sputtering time t up to 1 min.

Figure 5:
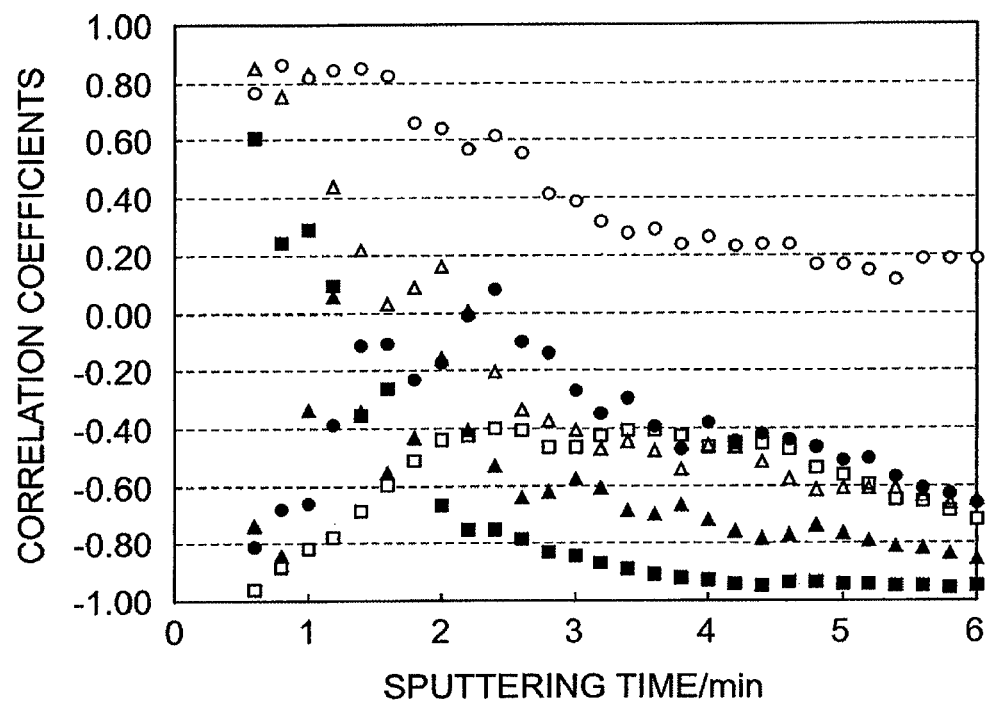
FIG. 5 is a graph showing the change in correlation coefficients plotted against sputtering time t in membranes of Example 2, Comparative Example 2 and Comparative Example 3.

In addition, based on the above obtained results, all correlation coefficients between $t_1, t_2, \ldots, t_n$ and $f(t_1), f(t_2), \ldots, f(t_n)$ at a sputtering time of $t_n$ (wherein $n \geq 4$) were calculated for the polymer electrolyte membranes of Example 2, Comparative Example 2 and Comparative Example 3, respectively, using $f(t)=A/(A+B)$. Results were obtained thereby that can be expressed as a graph showing the change in the correlation coefficient plotted against sputtering time t. as shown in FIG. 5. In FIG. 5 the plots of the black and white squares represent the first surface and second surface, respectively, of the polymer electrolyte membrane of Example 2, the plots of the black and white triangles represent the first surface and second surface, respectively, of the polymer electrolyte membrane of Comparative Example 2, and the black and white circular plots represent the first surface and second surface, respectively, of the polymer electrolyte membrane of Comparative Example 3.

As shown in FIG. 5, in the polymer electrolyte membrane of Example 2 it was verified that the correlation coefficients at the second surface were negative in the entire measured range. On the other hand, the correlation coefficients at the first surface were positive in the range of sputtering time t of 1.2 min or less.

Compared with this, in the polymer electrolyte membrane of Comparative Example 2 the correlation coefficients at the first surface in the range of sputtering time t of about 1.2 min were positive, the correlation coefficients at the second surface in the range of sputtering time t of 2 min or less were positive.

Further, in the polymer electrolyte membrane of Comparative Example 3 the correlation coefficients at the first surface in the range of sputtering time t of about 2.4 min were positive, the correlation coefficients at the second surface were positive in the entire measured range.

[Measurement of Membrane Resistance]

The through-thickness membrane resistance of the polymer electrolyte membranes of Example 2, Comparative Example 2 and Comparative Example 3, respectively, was measured in the same manner as described in Example 1. Table 2 shows the results that were obtained together with the membrane thickness and ion-exchange capacity of each polymer electrolyte membrane.

TABLE 2

| | Membrane thickness (μm) | Ion-exchange capacity (meq/g) | Through-thickness membrane resistance (mΩ·cm$^2$) |
|---|---|---|---|
| Example 2 | 27 | 2.4 | 43 |
| Comparative Example 2 | 27 | 2.4 | 47 |
| Comparative Example 3 | 29 | 2.4 | 59 |

From Table 2 it was confirmed that the polymer electrolyte membrane of Example 2 has lower through-thickness resistance than that of Comparative Example 2 and Comparative Example 3, and therefore has excellent through-thickness proton conductivity.

What is claimed is:

1. A polymer electrolyte membrane containing a polymer compound comprising an ionic segment having an ionic functional group and a nonionic segment having substantially no ionic functional group, wherein
a phase containing the ionic segments as a main component and a phase containing the nonionic segments as a main component are phase-separated, and in the surface region of at least one surface thereof, a change in an amount of the ionic segment substantially decreases monotonically from the surface toward the interior.

2. The polymer electrolyte membrane according to claim 1, wherein the polymer compound is an aromatic polymer compound.

3. The polymer electrolyte membrane according to claim 1, wherein the polymer compound contains a structural unit represented by General Formula (1) below:

(1)

(wherein, $Ar^1$ represents a divalent aromatic group having at least an ionic functional group directly bonded to the aromatic ring as a substituent thereof, and $X^1$ represents a direct bond, oxy group, thioxy group, carbonyl group, or sulfonyl group).

4. The polymer electrolyte membrane according to claim 1, wherein the polymer compound is a block copolymer having the ionic segment and the nonionic segment.

5. The polymer electrolyte membrane according to claim 4, wherein the ionic segment has a structure represented by General Formula (2) below:

(2)

(wherein, $Ar^{11}$ represents a divalent aromatic group having at least an ionic functional group directly bonded to the aromatic ring as a substituent thereof; $X^{11}$ represents a direct bond, oxy group, thioxy group, carbonyl group, or sulfonyl group; and d represents an integer of 2 or more).

6. The polymer electrolyte membrane according to claim 4, wherein the ionic segment has a structure represented by General Formula (3a) or General Formula (3b) below:

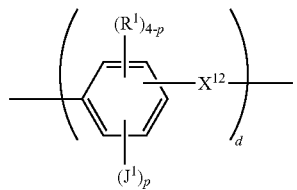
(3a)

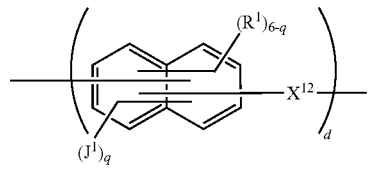
(3b)

(wherein, $X^{12}$ represents a direct bond, oxy group, thioxy group, carbonyl group, or sulfonyl group; $R^1$ represents independently a hydrogen atom, $C_{1-20}$ alkyl group, $C_{1-20}$ alkoxy group, $C_{6-20}$ aryl group, $C_{6-20}$ aryloxy group, or $C_{2-20}$ acyl group; $J^1$ represents an ionic functional group, p and q each independently represents 1 or 2; and d is an integer of 2 or more).

7. The polymer electrolyte membrane according to claim 1, wherein the ionic functional group is a sulfonic acid group.

8. The polymer electrolyte membrane according to claim 4, wherein the nonionic segment has a structure represented by General Formula (5) below:

(5)

(wherein, $Ar^{22}$ represents a divalent aromatic group having no ionic functional group; $X^{22}$ represents a direct bond, oxy group, thioxy group, carbonyl group or sulfonyl group; and e represents an integer of 2 or more).

9. The polymer electrolyte membrane according to claim 4, wherein the nonionic segment has a structure represented by General Formula (6) below:

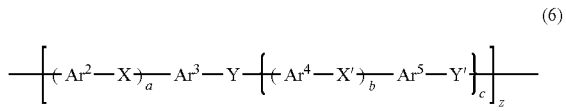
(6)

(wherein, a, b, and c each independently is 0 or 1, and z is a positive integer; $Ar^2$, $Ar^3$, $Ar^4$ and $Ar^5$ each independently represents a divalent aromatic group having no ionic functional group; X and X' each independently represents a direct bond or divalent group; and Y and Y' each independently represents an oxy group or an thioxy group).

* * * * *